US005616433A

United States Patent [19]

Kau

[11] Patent Number: 5,616,433

[45] Date of Patent: Apr. 1, 1997

[54] ELECTRICAL CONNECTOR FOR STORAGE BATTERIES

[75] Inventor: Pui K. Kau, Alameda, Calif.

[73] Assignee: Asian International Trades Company, Oakland, Calif.

[21] Appl. No.: 678,635

[22] Filed: Jul. 10, 1996

[51] Int. Cl.[6] .............................. H01M 2/20; H01R 11/26

[52] U.S. Cl. ........................... 429/121; 439/756; 439/801

[58] Field of Search ............................. 429/121; 439/756, 439/754, 762, 763, 764, 801, 761, 765

[56] References Cited

U.S. PATENT DOCUMENTS

| | | | |
|---|---|---|---|
| 1,614,382 | 1/1927 | Ness | 439/756 |
| 1,937,612 | 12/1933 | Walde | 439/756 |
| 3,673,550 | 6/1972 | Sherman | 439/756 |
| 5,062,812 | 11/1991 | Allen | 439/756 |
| 5,310,365 | 5/1994 | Hashimoto | 439/756 |
| 5,492,780 | 2/1996 | Okada | 429/121 |

*Primary Examiner*—Anthony Skapars
*Attorney, Agent, or Firm*—Ashok K. Janah

[57] ABSTRACT

An electrical connector (20) for connecting a battery post (25) to a wire (30) is described. The electrical connector (20) comprises a U-shaped clamp (35) having (i) a concave portion (40) sized to hold the battery post (25); and (ii) opposing first and second legs (45), (50) extending from the concave portion. The first leg (45) has a first hole (55) therethrough, and the second leg (50) has a second hole (60) that is substantially aligned with the first hole. Unitary compression means extending through the first and second holes of the U-shaped clamp, is provided for (i) compressing a wire against the U-shaped clamp, and (ii) compression fitting the U-shaped clamp about the battery post. In a preferred configuration, the unitary compression means comprises a wire holding compression stud (65) extending through the first hole (55) and second hole (60), and fastening means for tightening the stud (65) on the U-shaped clamp (35).

19 Claims, 2 Drawing Sheets

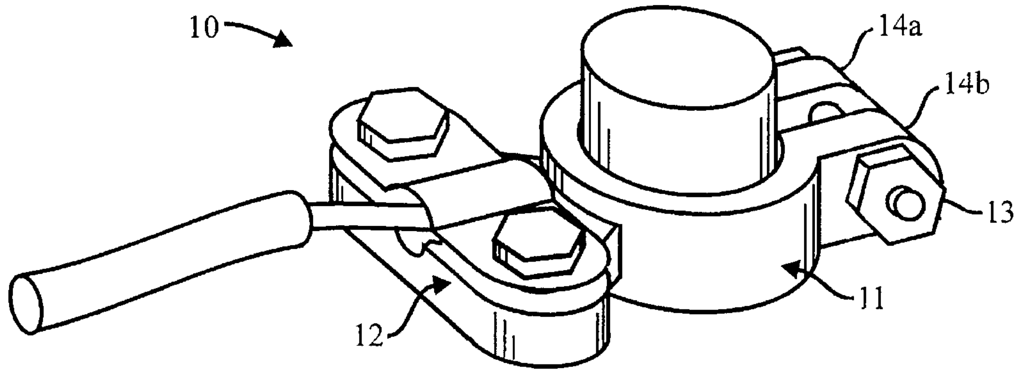
Fig. 1a (Prior Art)
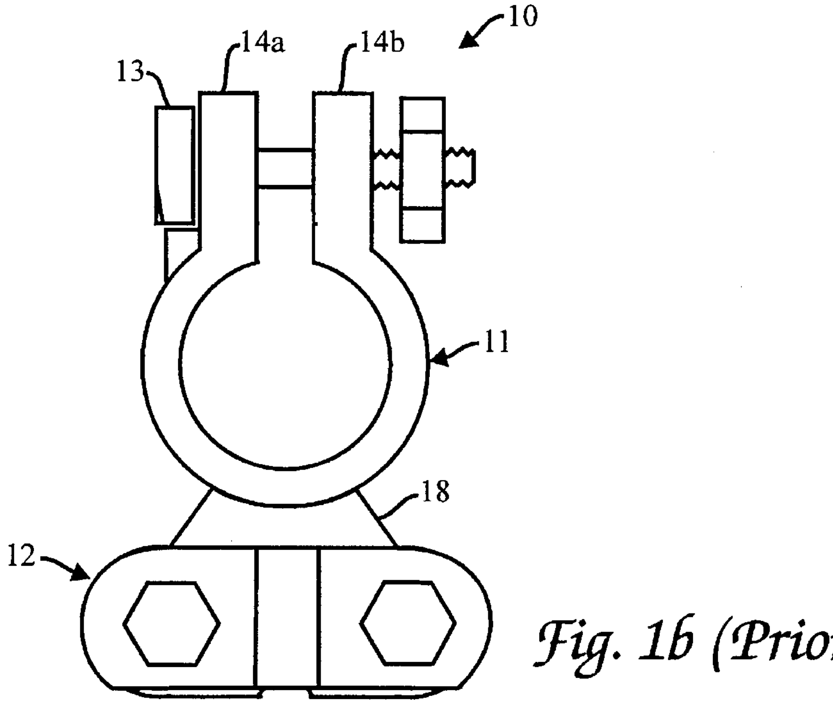
Fig. 1b (Prior Art)
Fig. 1c (Prior Art)
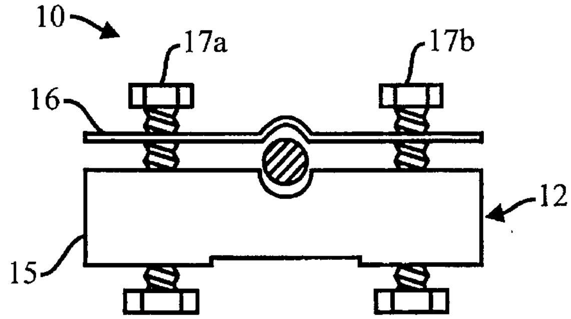

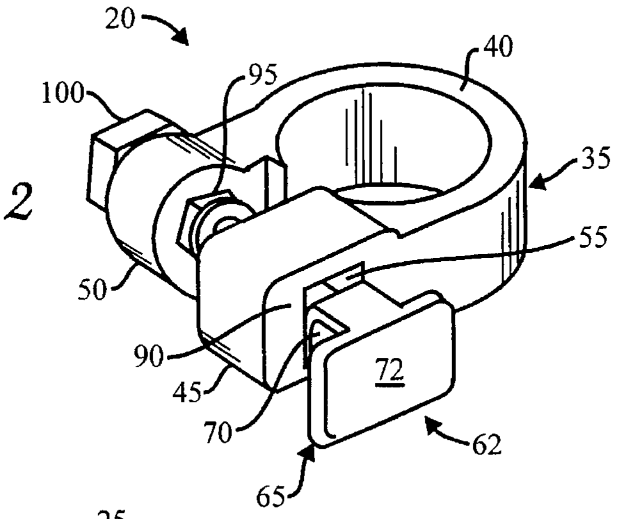
Fig. 2
Fig. 3
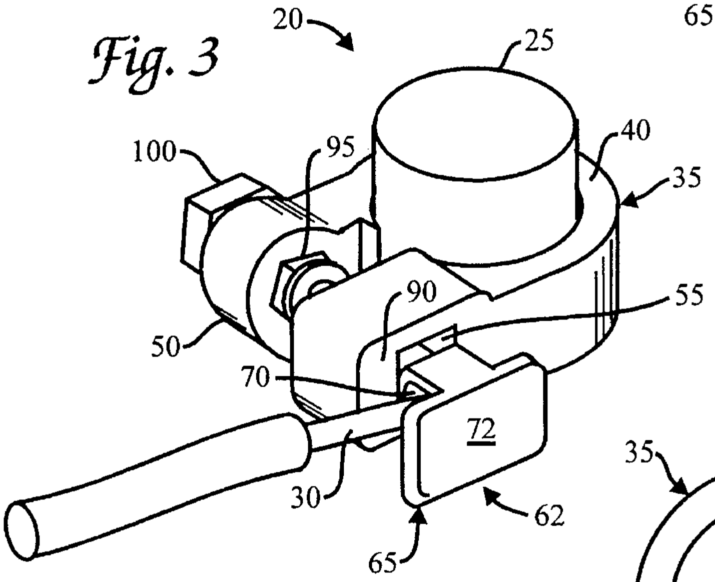
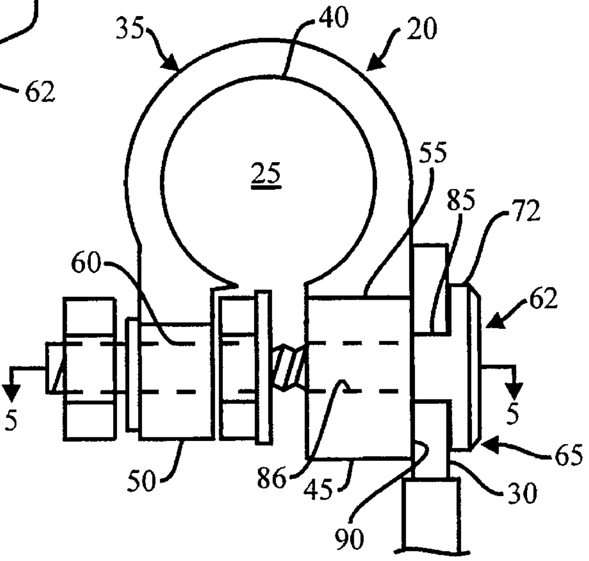
Fig. 4
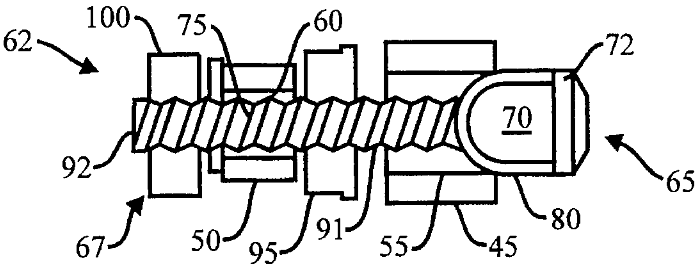
Fig. 5

ELECTRICAL CONNECTOR FOR STORAGE BATTERIES

BACKGROUND

The present invention relates to an improved electrical connector useful for connecting batteries to cable wire, and in particular, for connecting the battery posts of storage batteries to vehicles.

Electrical connectors that are used to connect the battery posts of storage batteries to the electrical systems of vehicles have demanding corrosion-resistance and vibration-withstanding requirements. The corrosion-resistance requirements arise from the highly corrosive galvanic coupling environment of storage batteries. Storage batteries typically contain corrosive acids that vaporize and condense on the battery posts and electrical junction points of the electrical connector. The hygroscopic acids and byproducts thereof, absorb moisture from the ambient environment to form highly corrosive chemical species which rapidly corrode the electrical connector, cable wire, and battery posts. Such corrosion is further aggravated by the galvanic coupling that occurs between the battery post, connector, and cable wire, due to the electrical charge flowing through the metal connector components. The electrical connectors are also subject to high levels of vibrational stresses during operation of the vehicles. The vibrational stresses can cause the electrical connectors to release the cable wire or loosen about the battery post, resulting in shorting and sparking of the electrical junction and malfunctioning of the vehicle.

Conventional electrical connectors that are fabricated using numerous components provide limited corrosion resistance and often fail in high vibration environments. For example, FIGS. 1*a*–1*c* show a conventional electrical connector 10 that comprises (i) a battery post connector 11 that compression fits around the battery post, and (ii) a side-mounted cable connector 12 that is clamped on an exposed cable wire. The battery post connector 11 is compression fitted about the battery post by tightening a nut and bolt assembly 13 extending through the free ends 14*a*, 14*b* of the battery post connector. The side-mounted cable connector 12 compresses the exposed cable wire between a base 15 and a clamping plate 16 by tightening of the nut and bolt assemblies 17*a*, 17*b* therethrough, as shown in FIG. 1*c*.

The side-mounted cable connector 12 of the electrical connector 10 has several operational disadvantages. First, the side-mounted cable connector 12 lengthens the overall size of the electrical connector 10 often rendering the connector unsuitable for use in small engine compartments of compact cars and motorcycles. In most storage batteries, the battery posts are located at the perimeter of the battery, causing the attached electrical connector 10 to extend outwardly from the battery (as shown in FIG. 1*a*), and resulting in electrical contact and shorting of the connector 10 with the electrically conductive portions of the vehicle. Also, the relatively large sized and outwardly extending connector 10 can limit access to other components within the engine compartment of the vehicle, and require that the connector 10 be disconnected during service or repair of the vehicle. Furthermore, the side-mounted connector 12 is also often structurally weak at the joint 18 with the battery post connector 11, and can break-off at the joint during fabrication or during mounting of the electrical connector 10.

Another problem with conventional electrical connectors 10 results from the multiple nut and bolt assemblies 13, 17*a*, 17*b* that are used to tighten the connector around the battery post, and to compress the cable wire in the side-mounted cable connector 12. The numerous nut and bolt assemblies increases the chances of loosening of one or more of the assemblies during operation of the vehicle due to the high vibrational stresses placed on the connector. This results in disconnection or sparking at the battery post and cable wire junctions. Also, the large number of separate components of the connectors reduces the corrosion-resistance of the connector, due in part to the large surface area of the components, and in part to the sharp corners and edges of the components which can rapidly corrode in galvanic coupling environments because of the higher inherent surface energy of such features.

Thus, it is desirable to have an electrical connector with a reduced number of components to minimize the corrosion and vibration-induced failure of the connector, during operation of the vehicle. It is even more desirable to have an electrical connector that comprises a single integral assembly of components. It is further desirable to have an electrical connector that occupies a small cross-sectional area for use in small engine compartments.

SUMMARY

The electrical connector of the present invention provides a small cross-sectional area, reduced number of components, and increased reliability. The electrical connector is useful for connecting a battery post of a storage battery to a wire. The electrical connector comprises a U-shaped clamp having (i) a concave portion sized to hold the battery post; and (ii) opposing first and second legs extending from the concave portion, the first leg comprising a first hole sized to receive a wire housing therein, and the second leg comprising a second hole substantially aligned with the first hole. Unitary compression means extend through the first and second holes, and are provided for (i) compressing the wire against the U-shaped clamp, and (ii) compression fitting the U-shaped clamp about the battery post.

In a preferred version, the unitary compression member comprises a wire holding compression stud and fastening means. The wire holding compression stud extends through the first and second holes of the U-shaped clamp, and comprises (i) a wire housing sized to fit into the first hole; (ii) a compression plate at one end of the wire housing, the compression plate having an area sized larger than the first hole, and (iii) a post attached to the other end of the wire housing, the post sized to extend through the second hole. Fastening means are used to tighten the wire holding compression stud on the U-shaped clamp so that the compression plate of the stud (i) forces the first and second legs of the U-shaped clamp toward one another causing the concave portion of the U-shaped clamp to compression fit the battery post, and (ii) compresses a wire in the wire housing between the compression plate and the first leg of the U-shaped clamp.

The electrical connector is used by mounting the connector on a battery post, inserting a wire in the wire housing, and tightening the fastening means on the wire holding compression stud so that the compression plate of the stud (i) forces the first and second legs of the U-shaped clamp toward one another causing the concave portion of the U-shaped clamp to compression fit the battery post, and simultaneously (ii) compresses a wire in the wire housing between the compression plate and the first leg of the U-shaped clamp. Preferably, the fastening means comprises (i) a first nut engaging a threaded middle portion of the post lying between the first and second legs, the first nut provided to tighten the post so that the compression plate can be forced against the first leg, and (ii) a second nut engaging a threaded end portion of the post for compressing the first and second legs toward one another.

DRAWINGS

These and other features, aspects, and advantages of the present invention will be better understood from the following drawings, description and appended claims, which illustrate examples of the invention, where:

FIG. 1*a* (Prior Art) is a perspective view of a conventional electrical connector;

FIG. 1*b* (Prior Art) is a top view of the electrical connector of FIG. 1*a;*

FIG. 1*c* (Prior Art) is a side front view of the electrical connector of FIG. 1*a;*

FIG. 2 is a perspective view of an electrical connector of the present invention;

FIG. 3 is a perspective view of the electrical connector of FIG. 2 mounted on a battery post and showing a cable wire inserted in the wire housing;

FIG. 4 is a top view of the electrical connector of FIG. 2; and

FIG. 5 is a side partial sectional view of the electrical connector of FIG. 2 as viewed in the direction of the arrow 5 in FIG. 4.

DESCRIPTION

The electrical connector 20 of the present invention is useful for connecting batteries to exposed cable wire. Batteries, such as rechargeable storage batteries, are used to provide electrical power for operating electrical or internal combustion engines, and to store electricity for other applications. A typical storage battery, such as a lead acid battery, has two battery posts 25 at the perimeter of the battery that serve as negative and positive terminals of the battery. Typically, each battery post 25 comprises a cylinder having a cross-section that tapers slightly in the upward direction to facilitate mounting of a conventional electrical connector. The battery post 25 is connected to an exposed cable wire 30 that electrically connects the battery to the external environment. The electrical connector 20 of the present invention is useful for electrically connecting the exposed cable wire 30 to the battery post 25, and provides increased vibration and corrosion resistance, reduced number of components, and a smaller cross-sectional usage area.

Referring to FIGS. 2 and 3, an electrical connector 20 of the present invention comprises a U-shaped clamp 35 having a concave portion 40 sized to extend around and hold a battery post 25. Opposing first and second legs 45, 50 extend outwardly from the concave portion 40 of the U-shaped clamp 35. The concave portion 40 of the U-shaped clamp 35 comprises a slight taper from the bottom to the top of the clamp, the taper sized to correspond to the taper of conventional battery posts 25. This provides a more secure connection between the U-shaped clamp 35 and the battery post 25.

The first leg 45 of the U-shaped clamp has a first hole 55 therethrough, and (ii) the second leg 50 has a second hole 60 therethrough, the second hole being substantially aligned with the first hole 55, as shown in FIGS. 4 and 5. The U-shaped clamp 35 is generally made from metal, such as steel or aluminum, and the concave portion 40 of the clamp is sized so that when the legs 45, 50 are compressed towards one another, the concave portion 40 compression fits and securely hold a battery post 25 of a storage battery. Conventional methods of fabrication of the U-shaped clamp include drop forging, casting, and injection molding.

A unitary compression means or member 62 extends through the first and second holes 55, 60, and is provided for (i) compressing the exposed cable wire 30 against the U-shaped clamp 35, and (ii) compression fitting the U-shaped clamp 35 about the battery post 25. The unitary compression member 62 serves as a single structure that performs both functions of securely gripping the exposed cable wire 30, and securely attaching the electrical connector 20 to the battery post 25, thereby reducing the number of components of the electrical connector 20 and providing increased vibration and corrosion resistance.

In a preferred configuration, the unitary compression member 62 comprises a wire holding compression stud 65 in combination with a fastener assembly 67 capable of tightening the wire holding compression stud 65 on the U-shaped clamp 35 so that the stud (i) forces the first and second legs 45, 50 of the U-shaped clamp toward one another causing the concave portion 40 of the U-shaped clamp to compression fit the battery post 25, and (ii) compresses exposed cable wire 30 in a wire holding portion of the stud (such as a wire housing as described below), against the U-shaped clamp 35.

The wire holding compression stud 65 extends through the first and second holes 55, 60 of the U-shaped clamp. The stud 65 comprises (i) a wire housing 70 for holding the cable wire 30 therein, (ii) a compression plate 72 at one end of the wire housing 70, and (iii) a post 75 is attached to the other end of the wire housing. The wire housing 70 is sized to fit into the first hole 55, and more preferably the first hole 55 is shaped and sized to hold the wire housing 70 therein, substantially without rotation or other movement of the wire housing 70. For example, the wire housing 70 can comprise sidewalls 80 extending from the post 75 and terminating at the compression plate 72, the sidewalls sized to fit into the first hole 55 of the U-shaped clamp. Preferably, the sidewalls 80 of the wire housing have a non-circular cross-section, and the first hole 55 has a corresponding or matching non-circular cross-section so that the wire housing 70 can be held in the first hole 55 without rotation of the housing. The non-circular cross-section, such as a rectangular, square, or triangular cross-section, prevents the wire housing 70 from rotating within the first hole 55 when the compression stud 65 is tightened on the U-shaped clamp 35. In a preferred configuration, the wire housing 70 has sidewalls 80 that extend downwardly from the compression plate 72 and join together in a U-shaped configuration at the post 75. This configuration provides increased structural rigidity and ease of manufacture of the wire housing 70.

With reference to FIG. 4, the compression plate 72 has an area sized larger than the first hole 55 so that the compression plate 72 can exert a compressive pressure on the U-shaped clamp that forces the first and second legs 45, 50 of the clamp against one another, when the compression stud 65 is tightened on the U-shaped clamp. Preferably, the compression plate 72 comprises a rectangular plate having at least one side 85 that is larger in length than a width 86 of the first hole 55. To increase the area over which the compression pate 72 exerts pressure on the first leg 45, a receiving surface 90 of the first leg extends beyond the first hole 55 and is sized to receive the compression plate 72. Preferably, the receiving surface 90 is shaped and sized substantially similar to that of the compression plate 72 to maximize the area upon which the compression plate 72 exerts a pressure. For example, if the compression plate 72 is comprises a rectangular plate 72, the receiving surface 90 of the first leg 45 is also shaped as a rectangle having substantially the same, or slightly larger, dimensions than the compress on plate 72. The compression plate 72 should be sufficiently thick to allow the plate to exert pressure against the first and second legs 45, 50 of the U-shaped clamp 35 without breaking from the applied stress.

The post 75 of the compression stud 65 is sized sufficiently long that at least a portion of post extends from the first hole 55 and through the second hole 60 of the U-shaped clamp. Preferably, the post 75 comprises a threaded middle portion 91 extending between the first and second legs 45, 50, provided for engaging a first threaded fastener for tightening the compression plate 72 of the stud against the first leg 45 so that the exposed cable wire 30 in the wire housing 70 is pressed against the first leg 45. The post 25 can also comprise a threaded end portion 92 extending beyond the second leg 50, the end portion 92 provided for engaging a second threaded fastener that compresses the compression plate 72 against the U-shaped clamp 35 so that the first and second legs 45, 50 are pressed toward one another, thereby compression fitting the concave portion 40 of the U-shaped clamp around the battery post 25. Preferably, the first and the second holes 55, 60 of the first and second legs 45, 50 have smooth surfaces without threads therein, so that the post 75 of the wire holding compression stud 65 can be easily inserted through the holes 55, 60 without engaging threads. This facilitates mounting of the stud 65 and allows the wire housing 70 of the stud to have non-circular cross-section, which prevents movement of the wire housing.

With reference to FIG. 5, a fastening means or fastener assembly 67 is provided for tightening the wire holding compression stud 65 onto the U-shaped clamp 35 to allow compression fitting of the U-shaped clamp on to the battery post 25 and to simultaneous constrict a wire 30 in the wire housing 70. In a preferred embodiment, the fastening assembly 67 comprises (i) a first nut 95 engaging the middle portion 91 of the threaded post 75 between the first and second legs 45, 50, the first nut provided to tighten the stud so that the compression plate 72 presses against the first leg; and (ii) a second nut 10 engaging the end portion 92 of the threaded post for compressing the first and second legs 45, 50 toward one another. The first and second nuts 95, 100 allow tightening of the compression stud 65 on the U-shaped clamp 35 so that the compression plate 72 presses against the first leg 45 to compress the exposed cable wire 30 in the wire housing 70, and simultaneously compression fit the concave portion 40 of the U-shaped clamp around the battery post 25.

To use the electrical connector 20, the connector is mounted on a battery post 25, and a cable wire 30 is inserted in the wire housing 70 of the wire holding compression stud 65, as shown in FIGS. 3–5. Thereafter, the fastener assembly 67 on the wire holding compression stud 65 is tightened so that the compression plate 72 of the stud forces the first and second legs 45, 50 of the U-shaped clamp toward one another causing the concave portion 40 of the U-shaped clamp to compression fit the battery post 25, and simultaneously (ii) compress a wire 30 in the wire housing 70 between the compression plate and the first leg of the U-shaped clamp. Initially, the first nut 95 is tightened until the compression plate 72 presses against the receiving surface 90 of the first leg 45, squeezing the cable wire 30 therebetween. This results in a firm, secure, and strong electrical connection between the compression plate 72, receiving surface 90 of the first leg 45, and the exposed cable wire 30 therebetween. Preferably, the first nut 95 comprises a serrated surface adjacent to the first leg to firmly grip the first leg 45. Thereafter, the second nut 100 is tightened, causing the compression plate 72 of the compression stud 65 to press the first and second legs 45, 50 toward one another, resulting in the concave portion 40 of the U-shaped clamp 35 squeezing against and compression fitting the battery post 25.

The electrical connector 20 of the present invention provides numerous advantages. First, the unitary construction of the wire holding compression stud 65 that serves both to compress the U-shaped clamp 35 about the battery post 25 and to securely hold the cable wire 30 in a wire housing 70, provides a simple connector 20 with a reduced number of components that increases the resistance to failure through vibration. In addition, the smaller number of components also reduces corrosion of the electrical connector 20 in corrosive environments. Also, the small number of components allows the connector 20 to be easily cleaned by scrapping the exposed area of the connector 20 with wire brushes.

Furthermore, the electrical connector 20 has a small footprint area which renders the connector particularly adapted for use in small spaces such as the engine compartments of small vehicles, such as motorcycles and compact car engines. Moreover, the simple construction of the components of the electrical connector 20, allows the components to be easily fabricated using drop forged, casting, and die casting methods.

Although the present invention has been described in considerable detail with regard to the preferred versions thereof, other versions are possible. For example, many different configurations can be used to form the unitary compression member, as would be apparent to those of ordinary skill in the art. Therefore, the appended claims should not be limited to the description of the preferred versions contained herein.

What is claimed is:

1. An electrical connector for connecting a battery post to a wire, the electrical connector comprising:

(a) a U-shaped clamp having (i) a concave portion sized to fit the battery post, and (ii) opposing first and second legs extending from the concave portion, the first leg having a first hole therethrough, and the second leg having a second hole therethrough, the second hole being substantially aligned with the first hole; and (b) unitary compression means extending through the first and second holes of the U-shaped clamp, the unitary compression means provided for (i) compressing a wire against the U-shaped clamp, and (ii) compression fitting the U-shaped clamp about the battery post, and the unitary compression means comprising:

(1) a wire holding compression stud extending through the first and second holes of the U-shaped clamp, the compression stud comprising (i) a wire housing sized to fit into the first hole, (ii) a compression plate at one end of the wire housing, the compression plate having an area sized larger than the first hole, and (iii) a post attached to the other end of the wire housing, the post sized to extend through the second hole; and (2) fastening means capable of tightening the wire holding compression stud on the U-shaped clamp so that the compression plate of the stud (i) forces the first and second legs of the U-shaped clamp toward one another causing the concave portion of the U-shaped clamp to compression fit the battery post, and (ii) compresses a wire in the wire housing between the compression plate and the first leg of the U-shaped clamp.

2. The electrical connector of claim 1, wherein the wire housing comprises sidewalls extending from the post and terminating at the compression plate, the sidewalls sized to fit into the first hole of the U-shaped clamp.

3. The electrical connector of claim 2, wherein sidewalls of the wire housing have a non-circular cross-section, and wherein the first hole has a corresponding non-circular cross-section so that the wire housing can be held in the first hole without rotation of the housing.

4. The electrical connector of claim 3, wherein the non-circular cross-section is selected from the group consisting of a rectangular, square, or triangular cross-section.

5. The electrical connector of claim 1, wherein the compression plate comprises a rectangular plate having at least one side that is larger in length than a width of the first hole.

6. The electrical connector of claim 1, wherein first leg comprises a receiving surface around the first hole, the receiving surface sized to receive the compression plate.

7. The electrical connector of claim 1, wherein the fastening means comprises (i) a first nut engaging a threaded middle portion of the post lying between the first and second legs, the first nut provided to tighten the post so that the compression plate can be forced against the first leg, and (ii) a second nut engaging a threaded end portion of the post for compressing the first and second legs toward one another.

8. An electrical connector for connecting a battery post to a wire, the electrical connector comprising:

(a) a U-shaped clamp having (i) a concave portion sized to hold the battery post, and (ii) opposing first and second legs extending from the concave portion, the first leg comprising a first hole sized to receive a wire housing therein, and the second leg comprising a second hole substantially aligned with the first hole;

(b) a wire holding compression stud extending through the first and second holes of the U-shaped clamp, the compression stud comprising (i) a wire housing sized to fit into the first hole, (ii) a compression plate at one end of the wire housing, the compression plate having an area sized larger than the first hole, and (iii) a post attached to the other end of the wire housing, the post sized to extend through the second hole; and (c) fastening means capable of tightening the wire holding compression stud on the U-shaped clamp so that the compression plate of the stud (i) forces the first and second legs of the U-shaped clamp toward one another causing the concave portion of the U-shaped clamp to compression fit the battery post, and (ii) compress a wire in the wire housing between the compression plate and the first leg of the U-shaped clamp.

9. The electrical connector of claim 8, wherein the wire housing comprises sidewalls extending from the post and terminating at the compression plate, the sidewalls sized to fit into the first hole of the U-shaped clamp.

10. The electrical connector of claim 9, wherein sidewalls of the wire housing comprise a non-circular cross-section, and wherein the first hole has a corresponding non-circular cross-section so that the wire housing can be held in the first hole without rotation of the housing.

11. The electrical connector of claim 10, wherein the non-circular cross-section is selected from the group consisting of a rectangular, square, or triangular cross-section.

12. The electrical connector of claim 8, wherein the compression plate comprises a rectangular plate having at least one side that is larger in length than a width of the first hole.

13. The electrical connector of claim 8, wherein first leg comprises a receiving surface around the first hole, the receiving surface sized to receive the compression plate.

14. The electrical connector of claim 8, wherein the fastening means comprises (i) a first nut engaging a threaded middle portion of the post lying between the first and second legs, the first nut provided to tighten the post so that the compression plate can be forced against the first leg, and (ii) a second nut engaging a threaded end portion of the post for compressing the first and second legs toward one another.

15. A method of using the electrical connector of claim 8, comprising the steps of:

(a) mounting the connector on a battery post;

(b) inserting a wire in the wire housing; and (c) tightening the fastening means on the wire holding compression stud so that the compression plate of the stud (i) forces the first and second legs of the U-shaped clamp toward one another causing the concave portion of the U-shaped clamp to compression fit the battery post, and (ii) compresses a wire in the wire housing between the compression plate and the first leg of the U-shaped clamp.

16. An electrical connector for connecting a battery post to a wire, the electrical connector comprising:

(a) a U-shaped clamp having (i) a concave portion sized to hold the battery post, and (ii) opposing first and second legs extending from the concave portion, the first leg comprising a first hole sized to receive a wire housing therein, and the second leg comprising a second hole substantially aligned with the first hole;

(b) a wire holding compression stud extending through the first and second holes of the U-shaped clamp, the compression stud comprising (i) a wire housing sized to fit into the first hole, (ii) a compression plate at one end of the wire housing, the compression plate having an area sized larger than the first hole, and (iii) a post attached to the other end of the wire housing, the post sized to extend through the second hole;

(c) a first nut engaging a threaded middle portion of the post lying between the first and second legs, the first nut provided to tighten the post so that the compression plate compresses a wire in the wire housing between the compression plate and the first leg of the U-shaped clamp; and (d) a second nut engaging a threaded end portion of the post for compressing the first and second legs toward one another so that the concave portion of the U-shaped clamp compression fits the battery post.

17. The electrical connector of claim 16, wherein the wire housing comprises sidewalls extending from the post and terminating at the compression plate, the sidewalls defining a non-circular cross-section that fits into a corresponding non-circular cross-section of the first hole so that the wire housing can be held in the first hole substantially without rotation of the housing.

18. The electrical connector of claim 17, wherein the non-circular cross-section is selected from the group consisting of a rectangular, square, or triangular cross-section.

19. The electrical connector of claim 16, wherein first leg comprises a receiving surface around the first hole, the receiving surface sized to receive the compression plate.

* * * * *